Jan. 24, 1956  S. M. BAGNO  2,732,544
TESTING MEANS FOR AN INTRUDER DETECTION SYSTEM
Filed Sept. 27, 1954
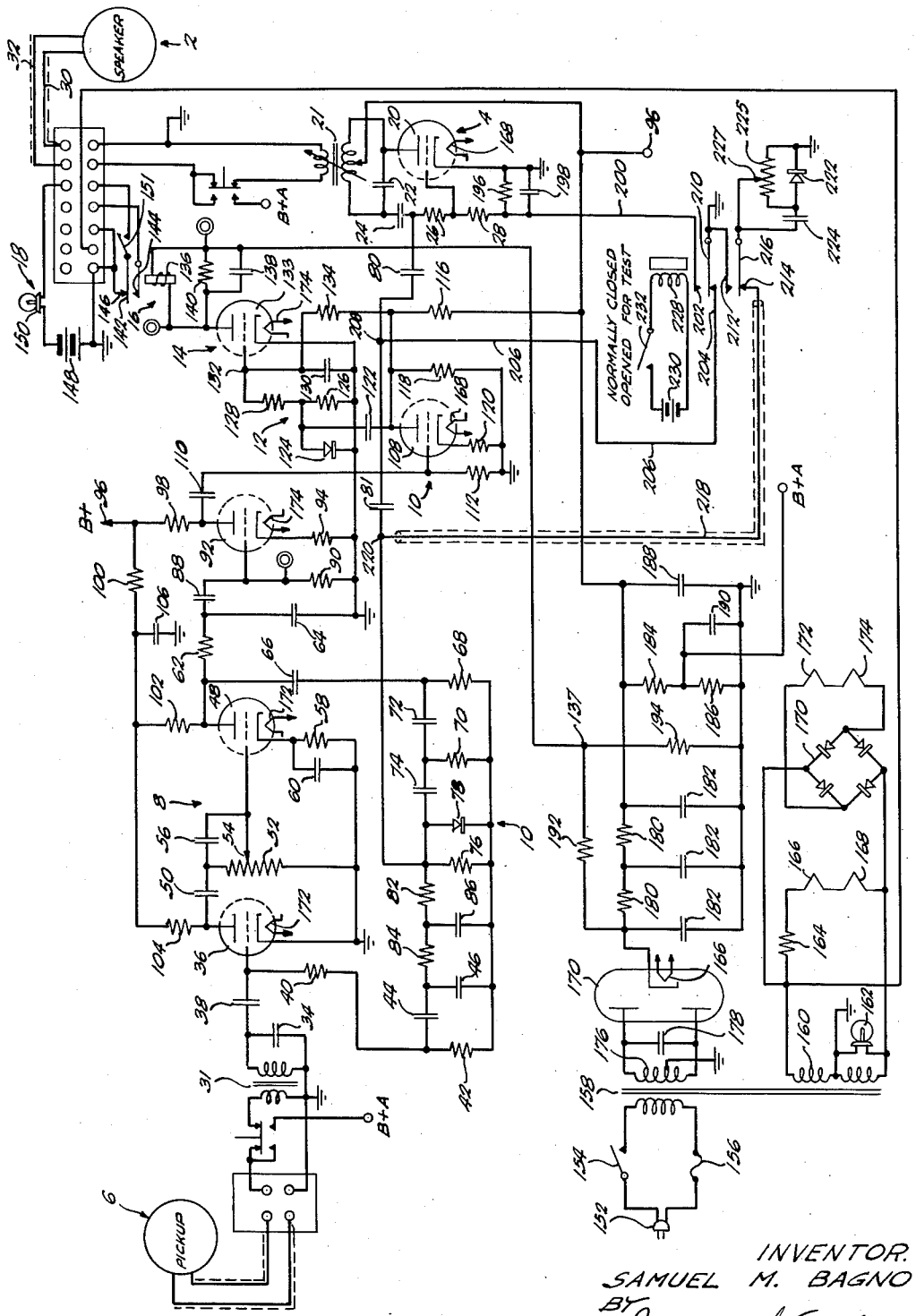
INVENTOR.
SAMUEL M. BAGNO
BY
*James and Franklin*
ATTORNEYS.

United States Patent Office

2,732,544
Patented Jan. 24, 1956

2,732,544

TESTING MEANS FOR AN INTRUDER DETECTION SYSTEM

Samuel M. Bagno, Astoria, N. Y., assignor to Walter Kidde & Company, Inc., Belleville, N. J., a corporation of New York Application September 27, 1954, Serial No. 458,507

21 Claims. (Cl. 340—214)

The present invention relates to a method and apparatus for testing the overall operability of an intruder detection system operating on the principle of filling a space to be protected with high frequency radiations.

A system of the type under discussion is described and claimed in Bagno Patent 2,655,645 of October 13, 1953, entitled "Method and Apparatus for Detecting Motion in a Confined Space." In that system radiations of a given high frequency are transmitted into a room or the like and the radiations in the room are then received and detected. If motion occurs in the room, either through movement of an intruder or through air turbulences of a predetermined intensity, a Doppler effect frequency will be impressed upon the transmitted frequency, and the detection of that Doppler effect frequency will actuate an alarm. A particular modification of the system under discussion designed to eliminate the effect of shock sounds or similar phenomena and featuring the use, in the detecting circuit, of a limiter-integrator system, is disclosed and claimed in application Ser. No. 371,854 of August 3, 1953, by Samuel M. Bagno, entitled "Alarm System With Means for Eliminating the Effect of Unwanted Signals," assigned to the assignee of this application.

Intruder detection systems of the type in question often actuate alarms in a remote central station which monitors a large number of such systems. It is important that the personnel at the central station be able to check the functioning of the detection system at each individual location in order that reliance should not be placed upon an inoperative or defective system. The customary testing arrangement is to provide the testing station with a switch which, when actuated, should energize the testing system in some appropriate manner so that an alarm will be signalled only if the system is in proper working order. It is, of course, most desirable that the test thus initiated should check as much as possible of the intruder detection system, including, if possible, the security of the premises involved.

One method which has been proposed and widely used for testing the system operating on the Doppler principle is the provision of a dummy intruder, that is to say, a mechanical simulation of the movement of an intruder. This is disclosed in Bagno Reissue Patent 23,820 of May 4, 1954, entitled "Dummy Intruder for Intruder Detection Systems."

The "dumy intruder" testing arrangement has functioned quite satisfactorily, but not in the best manner possible. The reason why it leaves something to be desired in the way of an overall check may perhaps be explained as follows: With the detection system in operation and when no intruder is present, radiations will fill the space to be protected and will eventually set up a standing wave pattern in that space. This pattern will be more or less undeterminable in advance, because of the many factors which affect it. The precise location of every object in the space to be protected will be significant; and from a practical point of view it will not be possible, each time the system is energized, to have all of those objects in precisely the same place. The location of the receiving transducer in the system is, however, usually fixed. Consequently its position with respect to the standing wave pattern will vary from time to time depending upon the precise orientation of that pattern. When the receiving transducer is located at or close to a null point in the standing wave pattern, the signals received by it will be weak, whereas if it is positioned at a node of the standing wave pattern it will generate strong signals. Hence the magnitude of the testing signals must be sufficient to set off the alarm even when the receiving transducer is at a null point on the standing wave. As a result the sensitivity of the system is not tested.

It would appear to be possible, although cumbersome, to compensate for this effect by varying a potentiometer setting each time that the system was put into operation in order to correspond to the particular standing wave pattern then existing. However, such does not prove to be the case. The presence in the space to be protected of a person making this adjustment would so modify the standing wave pattern that when he left the room the pattern might be different. Even if adjustment were to be made exteriorly of the premises to be protected, a more fundamental drawback is the fact that the standing wave pattern will vary with temperature. Thus even if the system should be accurately adjusted to correspond to the position of the receiving transducer with respect to the standing wave pattern existing at any given moment, unavoidable temperature changes in the space such as might be caused by the shutting down of radiators for the night or even a change in outside temperature would so modify the standing wave pattern as to render any such adjustment illusory.

The present invention provides for a testing arrangement by means of which the entire system, including the space to be protected, is effectively tested both as to amplitude and frequency sensitivity while at the same time avoiding the complicating factors set forth above. When the intruder detection system is to be tested, its normally continuous transmission of radiation into the space to be protected is converted into a cyclically pulsating transmission. Each pulse consists of a wave train of oscillations of the predetermined high frequency, the duration of the pulse being so related to the space to be protected that standing waves are not set up. Each pulse is followed by a period of non-radiation, that period being of sufficient duration so that the previously transmitted radiations reflected from walls and objects in the room has time to become substantially attenuated, thus preventing them from interfering with the oscillations of the next pulse or forming standing waves therewith. The frequency of the pulsation cycle (to be differentiated from the frequency of the oscillations present in each pulse) is within the range of the Doppler effect frequencies which the system is designed to detect or has a harmonic within that range. The detecting circuit is modified for testing purposes so as to convert detected oscillation pulses into pulsating signals having the same frequency as the pulsation cycle, thus simulating detection of Doppler effect frequencies. When the thus detected test signals have the proper frequency and magnitude, the alarm will be set off just as though an actual Doppler effect has been detected.

Because of the duration of each pulse and the length of time between pulses no standing wave patterns are set up during the period of test. Consequently the testing system will react in a uniform manner independently of the standing wave pattern which may exist prior to testing, thus providing a check on the sensitivity of the intruder detection system as a whole.

In the intruder detection systems of the type above mentioned, the Doppler effect frequencies are detected by beating signals corresponding to the received radiations against a signal corresponding to the transmitted radiations. This is usually accomplished by connecting the output of the oscillator which generates the transmitted frequencies to the detecting circuit at a point where that output can be mixed with the received signal. When testing is to take place in accordance with the present invention, this connection is broken—the output of the oscillator is no longer fed directly into the detecting circuit. This is done in order to prevent the detecting circuit from sensing the transmitted oscillations except as those oscillations are actually transmitted into the space to be protected, pass through that space, and become transformed into electrical signals by the receiving transducer. It is in this way that all, and not just a portion, of the intruder detection system is tested. The disconnection of the oscillator from the detection circuit has the further advantage of eliminating any complications which might arise through phase differences between signals received directly from the oscillator and signals deriving from that oscillator but received via the receiving transducer.

The testing system has a sensitivity which may be readily adjusted so that the test will be effective only if the detection system per se is operating in a manner such as to be capable of detecting intruder signals of a predetermined minimal magnitude.

While the testing method and apparatus of the present invention are here disclosed specifically in connection with the intruder detection system provided with a limiter integrator circuit as shown in aforementioned Bagno application Serial No. 371,854, it will be understood that this is for illustrative purposes only, and that the applicability and significance of the present invention is not limited to such a system.

To the accomplishment of the above, and to such other objects as may hereinafter appear, the present invention relates to a method and system for the testing of an intruder detection system, as defined in the appended claims and as described in this specification, taken together with the accompanying drawing, which is a circuit diagram of the overall system involved.

As will be apparent from the introductory remarks above, an understanding of the functioning of the testing arrangement requires an understanding of the operation of the intruder detection system itself. Accordingly that system and the manner in which it operates to detect intruders will first be described.

*The intruder detection system*

In general the system in connection with which the instant invention is specifically illustrated comprises a transmitter generally designated 2 adapted to be energized by an oscillator 4 so as to transmit vibration of a predetermined frequency of, for example 19 kilocycles per second, into a confined space. These radiations are reflected from walls and objects in the room and eventually impinge upon a receiver 6 which transforms the received radiations into an electrical signal fluctuating at a corresponding frequency. These signals are amplified in an amplifier section 8 and are then caused to beat with the original transmitted frequency in a detecting circuit portion 10 so that, if the received radiations differ in frequency from the transmitted radiations, as will be the case if there is movement within the confined space, a signal is produced having a frequency equal to the difference between the received and transmitted frequencies. The frequency of this signal is fairly low, the system usually being designed to detect such frequencies within the range of approximately 3 and 180 cycles per second. These frequencies will hereinafter be referred to as "low" frequencies, the transmitted and received frequencies being referred to as "high" frequencies. These terms are relative, and it will be appreciated that their actual magnitudes may be widely varied. For example, the high frequency could be in the radio frequency spectrum, and the low frequency would have a much lower range than that specified.

The low frequency signal is amplified, in the embodiment here specifically disclosed passing through the same amplifier section 8, and is then fed to an amplitude-limiting circuit generally designated 10, the output of which will have substantially the same frequency as the input but the amplitude of the output of which will not substantially exceed a given value no matter how much the amplitude of the low frequency pulses fed thereinto may exceed a normal predetermined value. Of course, weak input signals may produce correspondingly weak output signals. The important point is that there is an upper limit on the amplitude of the output signals.

The output from the amplitude-limiting circuit 10 is fed to an integrator circuit generally designated 12, where it is integrated with respect to time. The output of the integrating circuit 12 is connected to a control circuit generally designated 14 which as here disclosed is bias-sensitive and which is biased by the integrating circuit 12. The control circuit 14 is operatively connected to a relay generally designated 16 which controls the operation of an alarm of any desired type, generally designated 18.

The nature of the control circuit 14 is such that it will cause the relay 16 to close and actuate the alarm 18 only when a bias of predetermined amount is applied thereto. The integrating circuit 12 and limiter circuit 10 are so designed that such a bias will be produced only when a predetermined number of impulses are received from the low frequency signal within a given period of time, and when those impulses have a predetermined minimal magnitude. The amplitude-limiting circuit 10 serves to ensure that any excess in magnitude of the impulses in the low frequency signal over and above this normal minimal magnitude will have no effect on the control circuit 14.

Having reference now specifically to the circuit of Fig. 1, the basic transmitted frequency of approximately 19 kilocycles per second is generated by the oscillator circuit 4, defined by the triode 20 (half of a 6NS7 tube) the frequency of output of which is determined by the center tapped primary of transformer 21 across which the .0015 mfd. condenser 22 is connected, the output of the tube 20 being fed back to the grid thereof by means of .001 mfd. condenser 24 and 22,000 ohm resistor 26. A grid bias resistor 28 of 47,000 ohms is connected between the grid and the cathode. The transformer 21 steps down the output of the oscillator to approximately 6 volts, that output being fed to transmitter 2 by means of shielded leads 30 and 32.

The receiving transducer 6 picks up radiations impinging thereon and converts them into corresponding electrical fluctuations which are fed to the primary of transformer 31 which functions as a step-up transformer and the secondary of which is tuned by means of the 200 mmfd. condenser 34. The output of this tuned circuit is coupled to the grid of tube 36 (one half of a 6SL7 tube) by means of 200 mmfd. condenser 38, a 220,000 ohm grid resistor 40 leading to ground via 10 megohm bias resistor 42, the latter being by-passed for high frequencies by .01 mfd. condenser 44 and .05 mfd. condenser 46. The output of tube 36 is coupled to the grid of tube 48 (the other half of the 6SL7 tube) by means of .01 mfd. condenser 50 and grid bias potentiometer 52, the latter having a resistance of 1 megohm and having a movable tap 54 by-passed by 500 mmfd. condenser 56. Because of the low impedance of the condenser 56 to the high frequency signal, the position of the tap 54 along the potentiometer 52 will have little effect on the magnitude of that signal, except when the tap 54 is very close to the low end of the potentiometer 52, at which time the impedance from the tap 54 to ground approaches the impedance of condenser 56, thus causing the high frequency signal to be attenuated. The primary function of the tap 54, as will become apparent later in the explanation, is to control the amplitude of the detected low frequency signal and thus to control the sensitivity of the unit to the amplitude of detected Doppler frequency effects.

The high frequency signal will be amplified by tube 48, whose bias is derived from the cathode biasing resistor 58 of 4,700 ohms, high frequency being by-passed by .1 mfd. condenser 60. The 510,000 ohm resistor 62 and the .01 mfd. condenser 64 constitute a low-pass filter which will not permit high frequency components to pass. The high frequency signal is coupled by 500 mmfd. condenser 66 to a high-pass filter defined by 510,000 ohm resistors 68 and 70 and 500 mmfd. condensers 72 and 74, together with 470,000 ohm resistor 76. A selenium rectifier 78 is connected across resistor 76 and, by shunt rectification, detects the high frequency signal amplified by tube 48 and passed by the high-pass filter. At the same time, a portion of high frequency output from the oscillator 4 is coupled thereto by means of 10 mmfd. condensers 80 and 81, thus causing the received high frequency signal to beat against the signal transmitted by the speaker unit, and if it received a signal at a frequency different from the transmitted signal, to produce a low frequency signal having a frequency equal to the beat or difference between the received and transmitted frequencies.

The frequency of such variations in the received signal caused by an intruder or by fire may range from between 3 and 180 cycles per second in a normal burglar alarm installation. In order to prevent spurious alarms, such as might be caused by convection from normally operating radiators, it is preferred to cause the system to be actuated only when frequencies in a range between about 15 and 100 cycles per second are detected. The low-pass filter consisting of 220,000 ohm resistors 82 and 84, together with .01 mfd. condenser 86 and .05 mfd. condenser 46, permits the low frequency signal to pass therethrough, that signal being coupled to the grid of tube 36 by condenser 44 through resistor 40. The low frequency signal is then amplified by the same tube 36 which had previously amplified the high frequency signal. This simultaneous amplifying of low and high frequencies by the same tube is known as "reflexing" and it will be seen that both tubes 36 and 48 therefore operate as a two-stage reflex amplifier. The low frequency, when it reaches the potentiometer 52, is not by-passed by the condenser 56 and hence the setting of the tap 54 along the potentiometer 52 will control the amplitude of the low frequency signal applied to the grid of the amplifier tube 48. Because the cathode by-pass condenser 60 for the tube 48 has a value of .1 mfd., this stage of amplification is degenerative at the low frequencies only. The amplified low frequency signal is taken off the plate of the tube 48 by means of the low-pass filter defined by the resistor 62 and condenser 64. The low frequency signal is blocked from passing through the condenser 66 because of the high-pass characteristics of the filter 68—76. The low frequency signal is coupled by .01 mfd. condenser 88 and 1.2 megohm resistor 90 to the grid of amplifying tube 92 (one half of a second 6SL7 tube), that tube degeneratively cathode biased by 4700 ohm resistor 94.

Plate potential is applied to the tubes 36, 48 and 92 from B+ terminal 96 via 270,000 ohm resistor 98, 120,000 ohm decoupling resistor 100, 180,000 ohm resistor 102 and 270,000 ohm resistor 104, the plate voltage being by-passed to ground by 10 mfd. condenser 106.

The output of the amplifier tube 92, which consists exclusively of the low frequency if detected, is coupled to the grid of amplitude limiter tube 108 (the other half of the 6NS7 tube) by means of .01 mfd. condenser 110 and 2.2 megohm resistor 112. The plate of the tube 108 is connected to the B+ terminal 96 via 1.2 megohm resistor 116, and is also connected to ground via 160,000 ohm resistor 118. The resistors 116 and 118 define a voltage divider by means of which the plate of the tube 108 is operated at a voltage considerably lower than the voltage at the B+ terminal 96. For example, if the voltage at 96 is approximately 280 volts, the voltage at which the plate of tube 108 is operated will be approximately 25 volts. As a result no signal impressed on the grid of tube 108 can produce an output at the plate whose back to back voltage exceeds 25 volts. In that way the output of the tube 108 is limited so that no single transient pulse, no matter how large, can pass through the rest of the circuit and cause an alarm to be set off. The limiter is stabilized by the degenerative action of 3300 ohm cathode bias resistor 120. Hence, except for small signals, the amplitude of the output of the limiter circuit 10 is substantially constant and independent of the amplitude of the larger low frequency signal applied to the grid of tube 108.

The low frequency output from the limiter circuit 10 is coupled by .1 mfd. condenser 122 to selenium rectifier 124 and a 1.2 megohm resistor 126 connected in parallel. The rectifier 124 acts as a shunt rectifier across resistor 126. The low frequency signal caused by the motion of an intruder or by fire is converted by rectifier 124 into a series of negative pulses, one pulse for each cycle of the low frequency signal. These negative pulses are fed to an integrating circuit consisting of 1.2 megohm resistor 128 and .5 mfd. condenser 130, the junction point 132 therebetween being connected to the grid of tube 133 (the other half of the second mentioned 6SL7 tube), which forms a part of the control circuit 14.

The average plate voltage of the limiter tube 108, filtered by 10 megohm resistor 134 and capacitor 130, is applied to the selenium rectifier 124 through resistor 128. When there is no low frequency signal, there is no negative voltage developed by rectifier 124 and the positive threshold voltage is applied to the rectifier 124. No frequency signals reaching rectifier 124 via limiter tube 108 and condenser 122 will be rectified until they are large enough to overcome the positive threshold bias. Thus minor signals caused by small amounts of air turbulence or circuit noise will not be applied to the integrating circuit at all. Only if the magnitude of the low frequency signal is great enough will any rectification take place. That rectification will tend to build up a negative change on the upper end of condenser 130 and thus bias the grid of tube 14 negatively.

The charge on condenser 130 will tend to lead off via resistors 126 and 128, the rate of leakage being determined by the magnitude of these latter components. The integrating circuit will therefore have a characteristic and predetermined time-charge characteristic. If an insufficient number of cycles of low frequency signal are rectified by rectifier 124 within a given period of time, the charge on condenser 130 will not be built up sufficiently to overcome the positive bias normally applied thereto. It is only when a predetermined number of such cycles of low frequency signal are rectified that the positive bias on the grid of tube 14 will be overcome and, it will be noted, because of the interposition of the limiter circuit 10 ahead of the integrator circuit 12, the latter will not be affected by variations in the amplitude of the low frequency signal above a certain predetermined normal value.

The alarm relay coil 136 is connected in the plate circuit of tube 133, plate voltage being supplied from B+ terminal 137. Shunted across coil 136 are 10 mfd. condenser 138 and 15,000 ohm resistor 140 in parallel, the former acting as a filter condenser to prevent chatter, and the latter acting as a protective resistor to prevent condenser 138 from being subjected to overvoltage should the relay coil 136 be opened or the relay removed.

The tube 133, to the grid of which a positive bias is normally applied, therefore normally passes current. The relay coil 136 is normally energized, and the relay armature 142 is normally engaged with blind fixed contact 144. The fixed contact 146, with which the armature 142 makes contact when the relay coil 136 is de-energized (and with which it is shown engaged in the drawing), is connected through battery 148 to an alarm instrumentality 18 which may take any desired form and which is here specifically disclosed as a bell 150. It will therefore be appreciated that so long as the tube 14 passes a sufficient amount of current the circuit through the alarm instrumentality 18 will be open, but whenever the relay coil 136 is insufficiently energized, as will be the case when a sufficiently negative bias is applied to the grid of the tube 133 by the integrating circuit 12, the armature 142 will engage the fixed contact 146 (as shown in the drawing), the circuit through the instrumentality 18 will be closed, and the alarm will be set off. Manual switch 151 is interposed in the alarm circuit and is adapted to be closed by the last person to leave the premises to be portected, thus closing the circuit to the alarm 18, which may be located in the central station remote from the premises to be protected.

By choice of values of circuit components, any desired operating conditions can be achieved. With the circuit components here specifically disclosed, it has been found that approximately 10 pulses per second of normal magnitude received by the integrator circuit 12 will cause the alarm to go off, but any fewer number of pulses per second will not cause the alarm to go off. From a practical point of view, this means that one shock sound per second will not set off the alarm but that a multiplicity of shock sounds occurring continuously every tenth of a second, for example, will set it off. Shock sounds of the latter frequency are so rare that they warrant investigation, and consequently this is not deemed to be a drawback. This particular adjustment means that movement of an intruder of approximately 3½ inches in a second will still cause the alarm to go off, and this limitation is entirely practical.

The power supply for the system is illustrated in the lower left hand corner of the drawing. A connector 152 is adapted to be plugged into any appropriate source of alternating current, such as a wall socket. A switch 154 and a fuse 156 connect the primary of transformer 158 with that source. The transformer 158 is provided with a center tapped secondary 160 across one section of which a pilot lamp 162 is connected, that secondary feeding through 1 ohm resistor 164 to provide alternating current for the heaters 166 and 168 of rectifying tube 170 and tubes 20 and 108 respectively. The transformer 160 also supplies alternating current to full wave selenium rectifier 170, which provides direct current for the heaters 172 and 174 of the tubes 36, 48 and 92, 133 respectively. Another center tapped secondary 176 of the transformer 158 has its ends connected to the plates of twin diode rectifying tube 170, which may be of the 6×5 type. A .8 mfd. condenser 178 is connected between those plates. The cathode of tube 170 is connected to a filter circuit defined by 2000 ohm resistors 180 and 20 mfd. capacitors 182, that filter having 510,000 ohm resistor 184 and 270,000 ohm resistor 186 connected thereacross to form a voltage dropping arrangement, .5 mfd. capacitor 188 also being connected across the entire B+ supply and 10 mfd. capacitor 190 being connected across the resistor 186. The ungrounded end of the capacitor 188 is connected to B+ terminal 96 and supplies the potential thereto. 10,000 ohm resistor 192 and 20,000 ohm resistor 194 are connected between the cathode of the rectifier tube 170 and ground, the point 137 defining a terminal at which a different B+ potential is provided, that potential being fed to the plate of tube 133 via the relay coil 136.

*The testing circuitry*

Connected in parallel between the cathode of tube 20 and the grid resistor 28 thereof are a 1.5 megohm resistor 196 and a .02 mfd. capacitor 198, the ungrounded ends of these components being connected by lead 200 to relay terminal 202. Opposed relay terminal 204 is connected by lead 206 to point 208 on the connection between the capacitors 80 and 81. The relay armature 210 operable between the contacts 202 and 204 is grounded. A second set of relay contacts 212 and 214 are provided between which the armature 216 operates. The contact 212 is grounded. The contact 214 is connected, by means of shielded lead 218, to point 220 between the capacitor 81 and the low-pass filter in the detecting circuit defined by the components 42, 44, 46, 76, 82, 84, 86. The armature 216 is connected to germanium diode rectifier 222 via a 500 mfd. capacitor 224. The diode 222 is shunted by a 1 megohm potentiometer 225 the movable contact 226 of which is connected directly to the relay armature 216, and the remote end of the diode 222 is grounded. The relay is provided with a control coil 228 connected to battery 230 by means of switch 232. For safety purposes, the switch 232 is normally closed, so as to energize the coil 228 and move the relay armatures 210, 216 upwardly from the position in which they are shown and into engagement with the contacts 202 and 212 respectively. When that occurs the network 196, 198 is grounded and performs no useful function, and the network 222, 224, 225, 227 is isolated from the remainder of the system. The system will then function in the manner described above for intruder detection.

When a test is to be made the switch 232 is opened. The relay armatures 210 and 216 then assume the positions shown in the drawing. The network 196, 198 now becomes operative and has the effect of causing the oscillator 4 to operate intermittently. By suitable choice of values the intermittent operation of the oscillator 4 may be controlled as desired. In the instant system the oscillator will generate for approximately one millisecond and will become blocked and cease oscillation for approximately 49 milliseconds. This cyclic pulsing, it will be seen, will have a frequency of approximately 20 cycles per second, thus falling within the range of Doppler frequencies which the system is designed to detect. It is to be borne in mind that while the oscillator oscillates for one millisecond in each pulse, the oscillations nevertheless have a frequency of 19 kilocycles per second, so that there are approximately 20 high frequency cycles in each pulse. The timing of the pulses and the periods of time between the pulses may be varied provided that the criteria set forth at the beginning of this specification are substantially met, to wit, that the pulses themselves have a duration insufficient to produce standing waves in the space to be protected, that the time between pulses has a duration sufficient to permit the immediately preceding previously transmitted oscillations to become substantially attenuated, so that no standing waves will be formed between them and the oscillations of the next pulse, and so that the frequency of the pulsation cycle comes within the range of Doppler frequencies when it is in normal operation.

The connection made between the relay armature 210 and relay contact 204 grounds the line between the oscillator 4 and the detecting circuit per se. Hence the output of the oscillator never reaches the low-pass filter in the detection circuit. Engagement between the relay armature 216 and the contact 214 connects the diode 222 and associated circuitry to the detecting circuit. That circuit will now function as follows:

The individual pulses of high frequency oscillations pass through the amplifier 8 and the high pass filter 68—74. No appreciable rectification of these signals takes place at the rectifier 78 because the voltage of the signals is insufficient for a selenium cell rectifier. The high frequency signals cannot pass through the succeeding low pass filter, so they travel along lead 218 and through capacitor 224 to the germanium diode 222, where they are rectified. These rectified signals produce a voltage across the potentiometer 225 in the form of low frequency pulses, a predetermined proportion of those voltage pulses are picked off in accordance with the setting of the potentiometer slider 227, those pulses pass back along the lead 218 to the low pass filter, through which the pulses can pass, and thereafter those signals, now substantially in saw-tooth form, pass through the detecting circuit in the same manner as the signals corresponding to the detection of Doppler effect frequencies in the case of intruder detection. These saw-tooth signals, each of the proper cyclical frequency and the proper magnitude, will cause the alarm 18 to be actuated. When a limiter-integrator circuit is employed, as is here specifically disclosed, these signals must continue for a sufficiently long period of time to cause that circuit to function in the manner described above.

In actual practice the sensitivity adjustment 52, 54 of the detecting system is, of course, first set so that the system will detect intruder signals only of a predetermined minimal amplitude. The potentiometer 225, 227, is then adjusted while the testing switch 232 is open so that, with the above mentioned setting of the sensitivity potentiometer 52, 54, an alarm will be set off when the testing circuit is energized.

It will be apparent from the above description that every component of the detection system is tested, as well as all of the components of the testing system itself. Moreover, the sensitivity of the detector is also tested independently of the precise location of the receiver relative to the standing wave pattern. Also if for some reason transmitted test oscillations should fail to reach the receiver 6 completely or even if they should be excessively attenuated or initially transmitted at an insufficient amplitude, the alarm would not be actuated even if all of the circuitry were in perfect working condition. Thus if the switch 232 is opened and an alarm does not go off, the monitor is apprised that something is wrong someplace in the overall system, and he will therefore not rely upon that system for the detection of intruders until the flaw has been found and cured.

The frequency of the pulsation cycle has been described as being within the range of Doppler frequencies which the system is designed to detect. From an efficiency point of view this is preferred, but the testing system would also operate provided that a harmonic of the actual frequency of the pulsation cycle fell within the Doppler range. Thus, if a Doppler frequency of ten cycles per second is considered as detectable by the intruder detection system, a pulsation frequency of five cycles per second could be employed, its second harmonic, i. e., ten cycles per second, being active to actuate the testing system. Similarly a pulsation cycle of two cycles per second or 3⅓ cycles per second could be employed, the fifth and third harmonics respectively of those pulsation frequencies actuating the testing system. Of course, the use of harmonics for this purpose is less efficient than the use of pulsation frequencies directly within the Doppler range because, when harmonics are utilized, only a fraction of the transmitted energy is actually utilized in the testing of the system.

While but a single embodiment of the present invention has been here disclosed, it will be apparent that many variations may be made therein both as to details of the testing system itself and as to the specific types of intruder detection system with which it may be incorporated, all without departing from the spirit of the invention as defined in the following claims.

I claim:

1. The method of testing an intruder detection system, said system comprising, operatively within a space to be protected, means for transmitting energy of a given high frequency into said space, means for receiving energy of said high frequency, and a detecting circuit connected to said receiving means and adapted to actuate an alarm when frequencies differing from said transmitted frequency by a predetermined difference frequency are detected; said testing method comprising producing cyclically intermittent pulses of oscillatory energy, the individual pulses lasting for periods of time insufficient for them, when transmitted, to build up standing waves in said space, said pulses being separated by periods of no energy transmission, said periods being sufficiently long to permit the immediately previously transmitted energy pulses to become substantially attenuated within said space, the frequency of the cycle of transmitted pulses and periods of no transmission, or a harmonic thereof, corresponding to said predetermined difference frequency, and detecting said pulses and actuating said alarm in accordance with the detection thereof.

2. The method of testing an intruder detection system, said system comprising, operatively within a space to be protected, means for transmitting energy of a given high frequency in the ultrasonic range into said space, means for receiving energy of said high frequency, and a detecting circuit connected to said receiving means and adapted to actuate an alarm when frequencies differing from said transmitted frequency by a predetermined difference frequency on the order of twenty cycles per second are detected; said testing method comprising producing cyclically intermittent pulses of oscillatory energy, the individual pulses lasting for periods of time insufficient for them, when transmitted, to build up standing waves in said space, said pulses being separated by periods of no energy transmission, said periods being sufficiently long to permit the immediately previously transmitted energy pulses to become substantially attenuated within said space, the frequency of the cycle of transmitted pulses and periods of no transmission, or a harmonic thereof corresponding to said predetermined difference frequency, and detecting the frequency of said pulses and actuating said alarm in accordance with the detection thereof.

3. The method of claim 2, in which said individual pulses have a duration on the order of one millisecond and the periods of non-transmission have a duration on the order of 49 milliseconds.

4. The method of testing an intruder detection system, said system comprising, operatively within a space to be protected, an oscillator generating oscillation of a given high frequency, means operatively connected thereto for transmitting oscillations into said space, means for receiving oscillations from said space, and a detecting circuit connected to said receiving means and to said oscillator for beating said received oscillations with the output of said oscillator, detecting frequencies differing from said transmitted frequency by a predetermined difference frequency, and actuating an alarm in response to the detection of said predetermined difference frequency; said testing method comprising causing said oscillator to generate cyclically intermittent oscillation pulses, the duration of the individual pulses being insufficient for them, when transmitted, to build up standing waves in said space, said pulses being separated by periods of time sufficient to permit the immediately previously transmitted oscillation pulses to become substantially attenuated within said space, the frequency of said cycle, or a harmonic thereof, corresponding to said predetermined difference frequency, disabling the beating in said detecting circuit between the output of said oscillator and the received oscillations, and detecting said pulses and actuating said alarm in accordance with the detection thereof.

5. The method of testing an intruder detection system, said system comprising, operatively within a space to be protected, an oscillator generating oscillations of a given high frequency in the ultrasonic range, means operatively connected thereto for transmitting oscillations to said space, means for receiving oscillations from said space, and a detecting circuit connected to said receiving means and to said oscillator for beating said received oscillations with the output of said oscillator, detecting frequencies differing from said transmitted frequency by a predetermined difference frequency on the order of 20 cycles per second, and actuating an alarm in response to the detection of said predetermined difference frequency; said testing method comprising causing said oscillator to generate cyclically intermittent oscillation pulses of said given high frequency, the duration of the individual pulses being insufficient for them, when transmitted, to build up standing waves in said space, said pulses being separated by periods of time sufficient to permit the immediately previously transmitted oscillation pulses to become substantially attenuated within said space, the frequency of said cycle, or a harmonic thereof, corresponding to said predetermined difference frequency, disabling the beating in said detecting circuit between the output of said oscillator and the received oscillations, and detecting the frequency of said pulses and actuating said alarm in accordance with the detection thereof.

6. The method of claim 5, in which said oscillator generates individual oscillation pulses having a duration on the order of one millisecond, the periods of time between pulses having a duration on the order of 49 milliseconds.

7. In an intruder detection system comprising an oscillator generating oscillations of a given high frequency, means operatively connected thereto for transmitting said oscillations into a space to be protected, means for receiving oscillations from said space, a circuit operatively connected to said receiving means and comprising, in series, a high-pass filter, a first detector, a low pass filter, and a second detector the output of which is adapted to actuate an alarm, the output of said oscillator being connected to said circuit after said high-pass filter, whereby said alarm is actuated whenever said receiving means receives oscillations from said space having a frequency different from that of said transmitted oscillations by a predetermined difference frequency; a testing system comprising means for causing said oscillator to function cyclically in pulses, the frequency of the pulsation cycle, or a harmonic thereof, corresponding to said predetermined difference frequency, means for operatively disconnecting said oscillator from said circuit, a third detector in advance of said low-pass filter for detecting the output from said high-pass filter, and control means operatively connected to said testing system components for rendering them operative for testing purposes or inoperative to permit said system to detect intruders in normal fashion.

8. In the system of claim 7, adjustable means for controlling the amplitude of the output of said third detector.

9. The system of claim 7, in which said given high frequency is in the ultrasonic range and said predetermined difference frequency is on the order of 20 cycles per second.

10. In an intruder detection system comprising as oscillator generating oscillations of a given high frequency, means operatively connected thereto for transmitting said oscillations into a space to be protected, means for receiving oscillations from said space, a circuit operatively connected to said receiving means and comprising, in series, a high-pass filter, a first detector, a low-pass filter, a second detector and a limiter-integrator the output of which is adapted to actuate an alarm, the output of said oscillator being connected to said circuit after said high-pass filter, whereby said alarm is actuated whenever said receiving means receives oscillations from said space substantially continuously for a given period of time, having at least a minimal amplitude, and having a frequency different from that of said transmitted oscillations by a predetermined difference frequency; a testing system comprising means for causing said oscillator to function cyclically in pulses, the frequency of the pulsation cycle, or a harmonic thereof, corresponding to said predetermined difference frequency, means for operatively disconnecting said oscillator from said circuit, a third detector in advance of said low-pass filter for detecting the output from said high-pass filter, and control means operatively connected to said testing system components for rendering them operative for testing purposes or inoperative to permit said system to detect intruders.

11. In the system of claim 10, adjustable means for controlling the amplitude of the output of said third detector.

12. The system of claim 10, in which said given high frequency is in the ultrasonic range and said predetermined difference frequency is on the order of 20 cycles per second.

13. In an intruder detection system comprising an oscillator generating oscillations of a given high frequency, means operatively connected thereto for transmitting said oscillations into a space to be protected, means for receiving oscillations from said space, a circuit operatively connected to said receiving means and comprising, in series, a high-pass filter, a first detector, a low-pass filter, a second detector the output of which is adapted to actuate an alarm, the output of said oscillator being connected to said circuit after said high-pass filter, whereby said alarm is actuated whenever said receiving means receives oscillations from said space having a frequency different from that of said transmitted oscillations by a predetermined difference frequency; a testing system comprising means for causing said oscillator to function cyclically in pulses, the frequency of the pulsation cycle, or a harmonic thereof, corresponding to said predetermined difference frequency, the duration of each pulse being insufficient for the oscillations, when transmitted, to build up standing waves in said space and the time between pulses being sufficient to permit the immediately previously transmitted oscillation pulse to become substantially attenuated within said space, means for operatively disconnecting said oscillator from said circuit, a third detector in advance of said low-pass filter for detecting the output from said high-pass filter and control means operatively connected to said testing system components for rendering them operative for testing purposes or inoperative to permit said system to detect intruders.

14. In the system of claim 13, adjustable means for controlling the amplitude of the output of said third detector.

15. The system of claim 13, in which said given high frequency is in the ultrasonic range and said predetermined difference frequency is on the order of 20 cycles per second.

16. The system of claim 13, in which said given high frequency is in the ultrasonic range, said predetermined difference frequency is on the order of 20 cycles per second, the duration of each individual pulse is on the order of 1 millisecond, and the time between pulses is on the order of 49 milliseconds.

17. In an intruder detection system comprising an oscillator generating oscillations of a given high frequency, means operatively connected thereto for transmitting said oscillations into a space to be protected, means for receiving oscillations from said space, a circuit operatively connected to said receiving means and comprising in series, a high-pass filter, a first detector, a low pass filter, a second detector and a limiter-integrator the output of which is adapted to actuate an alarm, the output of said oscillator being connected to said circuit after said high-pass filter, whereby said alarm is actuated whenever said receiving means receives oscillations from said space substantially continuously for a given period of time, having at least a minimal amplitude, and having a frequency different from that of said transmitted oscillations by a predetermined difference frequency; a testing system comprising means for causing said oscillator to function cyclically in pulses, the frequency of the pulsation cycle, or a harmonic thereof, corresponding to said predetermined difference frequency, the duration of each pulse being insufficient for the oscillations, when transmitted, to build up standing waves in said space and the time between pulses being sufficient to permit the immediately previously transmitted oscillation pulse to become substantially attenuated within said space, means for operatively disconnecting said oscillator from said circuit, a third detector in advance of said low-pass filter for detecting the output from said high-pass filter, and control means operatively connected to said testing system components for rendering them operative for testing purposes or inoperative to permit said system to detect intruders.

18. In the system of claim 17, adjustable means for controlling the amplitude of the output of said third detector.

19. The system of claim 17, in which said given high frequency is in the ultrasonic range and said predetermined difference frequency is on the order of 20 cycles per second.

20. The system of claim 17, in which said given high frequency is in the ultrasonic range, said predetermined difference frequency is on the order of 20 cycles per second, the duration of each individual pulse is on the order of 1 millisecond, and the time between pulses is on the order of 49 milliseconds.

21. In the method of claim 1, in which said intruder detection system comprises a sensitivity adjustment means, the step of adjusting the sensitivity of the detection of said pulses to correspond to the sensitivity to which the intruder detection system is adjusted.

No references cited